United States Patent [19]
Scheinberg

[11] Patent Number: 6,030,088
[45] Date of Patent: Feb. 29, 2000

[54] CLEAR CASING FOR AN ELECTRONIC COMPONENT

[76] Inventor: George Scheinberg, 160-07 84th St., Howard Beach, N.Y. 11414

[21] Appl. No.: 09/017,471

[22] Filed: Feb. 2, 1998

[51] Int. Cl.[7] ............................. H04M 1/22; F21V 33/00
[52] U.S. Cl. ................... 362/85; 362/24; 362/88; 362/127; 362/253; 362/367; 312/223.2; 312/223.5; 40/545; 40/580
[58] Field of Search ........................... 362/85, 86, 89, 362/125, 127, 133, 253, 367, 88, 24; 348/836; 312/7.2, 223.1, 223.2, 223.3, 223.5, 237; 40/545, 564, 580

[56] References Cited

U.S. PATENT DOCUMENTS

| | | | |
|---|---|---|---|
| 2,223,196 | 11/1940 | Watkins | 312/223.3 |
| 2,669,708 | 2/1954 | Du Mont | 362/127 |
| 4,535,393 | 8/1985 | Aspenwall | 362/125 |
| 5,096,317 | 3/1992 | Phillippe | 312/223.2 |
| 5,515,069 | 5/1996 | Dillon, III | 362/253 |
| 5,564,209 | 10/1996 | Zagnoli | 312/7.2 |
| 5,722,754 | 3/1998 | Langner | 362/253 |
| 5,806,970 | 9/1998 | Giorgianni et al. | 362/253 |

*Primary Examiner*—Alan Cariaso
*Attorney, Agent, or Firm*—Michael I. Kroll

[57] ABSTRACT

A clear casing (10) for an electronic component (12) comprising an enclosure (14) made out of a transparent plastic material (16) which extends about the periphery of the electronic component (12), so as to enhance the esthetic appearance of the electronic component (12).

16 Claims, 5 Drawing Sheets

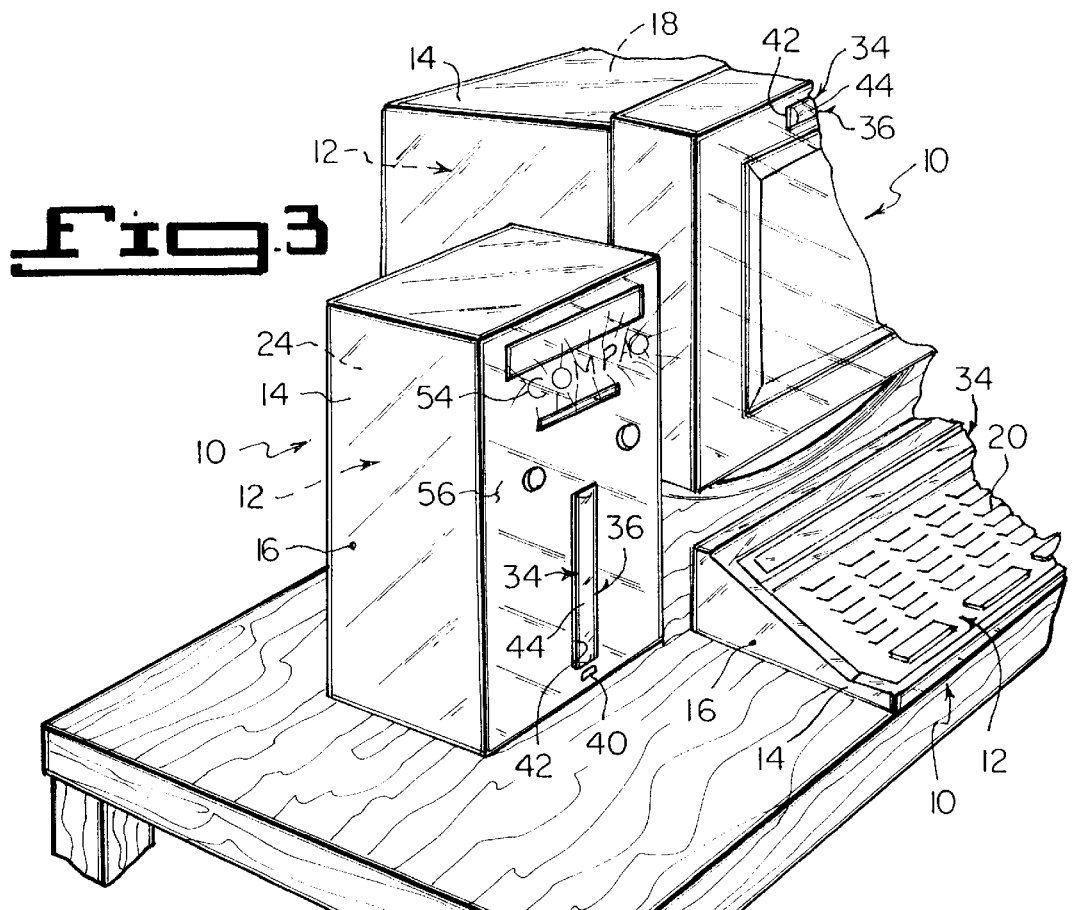
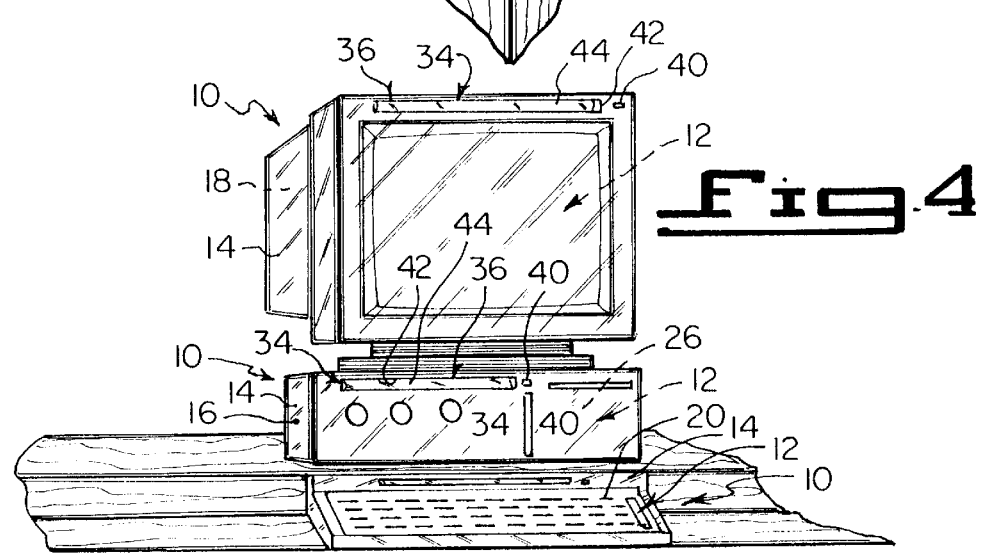

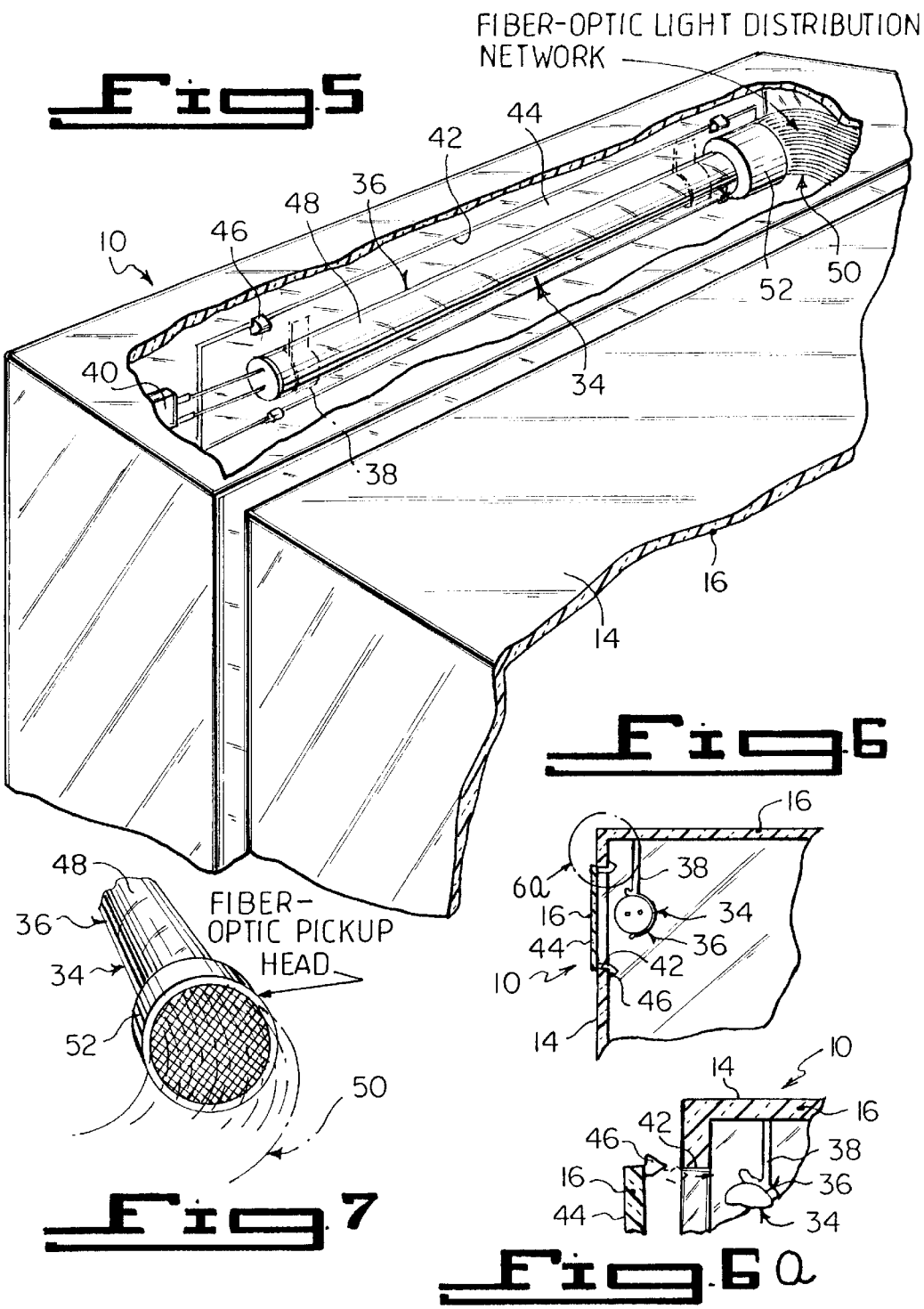

CLEAR CASING FOR AN ELECTRONIC COMPONENT

BACKGROUND OF THE INVENTION

1. Field of the Invention

The instant invention relates generally to protective covers and more specifically it relates to a clear casing for an electronic component. The clear casing is an enclosure made out of a transparent plastic material which extends about the periphery of the electronic component, so as to enhance the esthetic appearance thereof.

2. Description of the Prior Art

Numerous protective covers have been provided in prior art. For example, U.S. Pat. Nos. 5,163,870 to Cooper; U.S. Pat. No. 5,245,146 to Florence; U.S. Pat. Nos. 5,551,497 to Stanley and U.S. Pat. Nos. 5,567,054 to Dalgleish all are illustrative of such prior art. While these units may be suitable for the particular purpose to which they address, they would not be as suitable for the purposes of the present invention as heretofore described.

COOPER, DEAN C.

PROTECTIVE DUST COVER FOR COMPUTER COMPONENTS

U.S. Pat. No. 5,163,870

A dust cover for protecting a computer component includes an open bottom enclosure which completely covers the computer component and includes a lower edge having a compressible seal member which engages the resting surface on which the component is situated. The cover can be constructed from a clear acrylic material and can be provided with a notched opening in a rear wall for running electrical power supply cords and related wires therethrough. To provide for sufficient cooling of the enclosed component, an exhaust fan is located in an opening formed in the rear wall of the cover and draws cooling air through a separate replaceable filter element located in an inlet opening provided in the cover. If it is necessary to have access to the component such as the disk drive unit, a sliding access door can be provided at the appropriate location. In the preferred embodiment, two covers are used to form an assembly, with the lower cover provided to enclose a central processing unit housing (CPU), and an upper cover provided for enclosing a computer monitor.

FLORENCE, LINDA K.

MOUSE COVER

U.S. Pat. No. 5,245,146

A protective cover for a hand operated computer control, sometimes referred to as a "mouse" where the protective cover has a cavity in which the "mouse" is held and shielded from dust and dirt. The cover has pivotal levers with downwardly projecting adjustable projections that contact buttons on the "mouse" to signal commands to a computer.

STANLEY, DAVID B.

DECORATIVE COMPUTER KEYBOARD COVER

U.S. Pat. No. 5,551,497

A decorative cover for computer keyboards having a covering material assembly of textile fabric, leather, vinyl, or other covering material sewn or otherwise fastened together, configured to conform to the general size and shape of a computer keyboard. The cover has a body covering portion and a key covering portion. The body covering portion has an opening through which the keyboard keys extend. The body covering portion is held in place on the keyboard by elastic banding and/or hook and loop fastening strips. The key covering portion overlays the keyboard keys and extends over and down the front and back sides of the keyboard lapping over the front and back sides of the body covering portion. The key covering portion is held in place by hook and loop fastening strips or other coordinated fastening devices.

DALGLEISH, RICK

ILLUMINATED BAG

U.S. Pat. No. 5,567,054

An illuminated bag having an open end and a closed end, a transparent pouch associated with the closed end, and chemiluminescent wand disposed within the pouch for illumination upon activating the chemiluminescent wand.

SUMMARY OF THE INVENTION

A primary object of the present invention is to provide a clear casing for an electronic component that will overcome the shortcomings of the prior art devices.

Another object is to provide a clear casing for an electronic component that is an enclosure made out of a transparent plastic material which extends about the periphery of the electronic component, so as to enhance the esthetic appearance thereof.

An additional object is to provide a clear casing for an electronic component that contains a replaceable colored neon light bulb with a fiber-optic distribution network carried therein, so as to further enhance the esthetic appearance of the electronic component, which can be a computer, a cellular telephone, a cash register and the like.

A further object is to provide a clear casing for an electronic component that is simple and easy to use.

A still further object is to provide a clear casing for an electronic component that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 3 is a front perspective view of a second type of desktop computer with parts broken away incorporating the present invention.

FIG. 4 is a front perspective view of a third type of desktop computer incorporating the present invention.

FIG. 5 is an enlarged rear perspective view taken in the direction of arrow 5 in FIG. 1, with parts broken away and in section, showing a fiber-optic light distribution network coupled to the neon light bulb therein.

FIG. 6 is a cross sectional view taken along line 6—6 in FIG. 2.

FIG. 6a is an enlarged cross sectional view of an area in FIG. 6 indicated by arrow 6a, showing the removable panel disengaged from the front opening.

FIG. 7 is a perspective view taken in the direction of arrow 7 in FIG. 5, with parts broken away and in phantom, showing the fiber-optic pickup head on an end of the neon light bulb.

Similar reference characters denote corresponding features consistently throughout the attached drawings.

DESCRIPTION OF THE PREFERRED EMBODIMENTS

Figure 1:
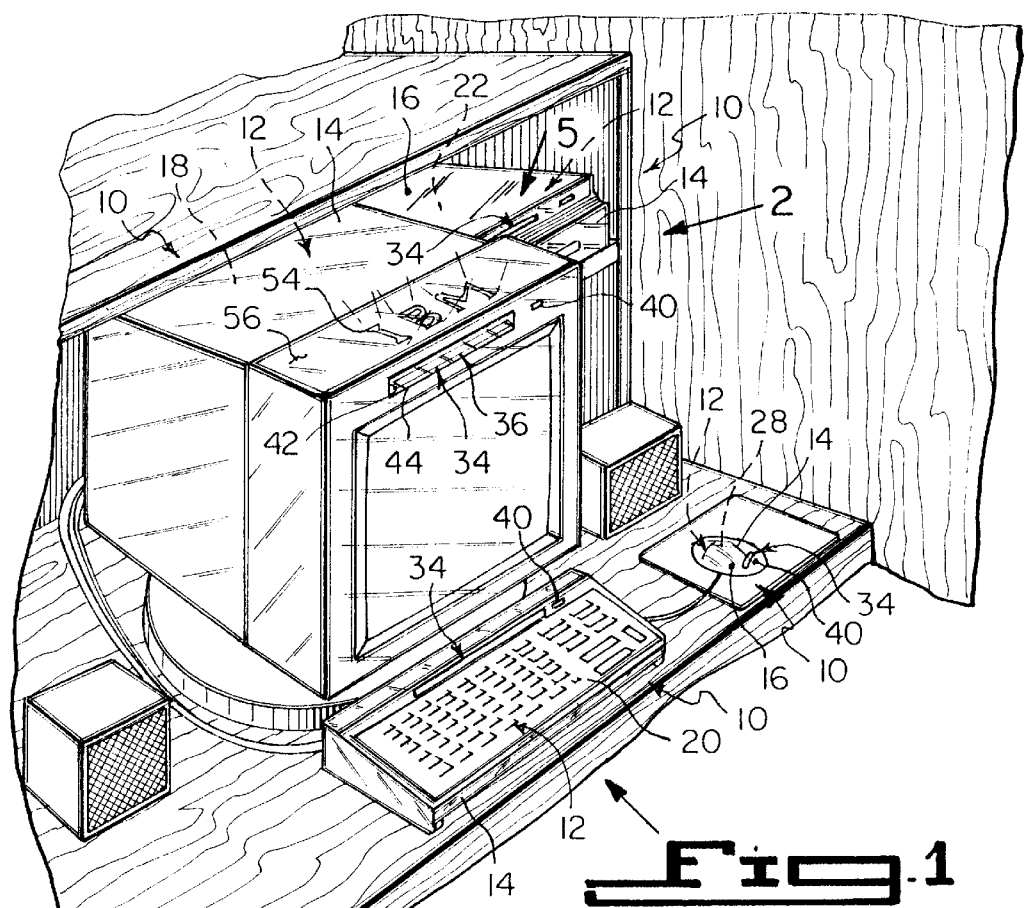
FIG. 1 is a front perspective view of a first type of desktop computer incorporating the present invention.
Figure 2:
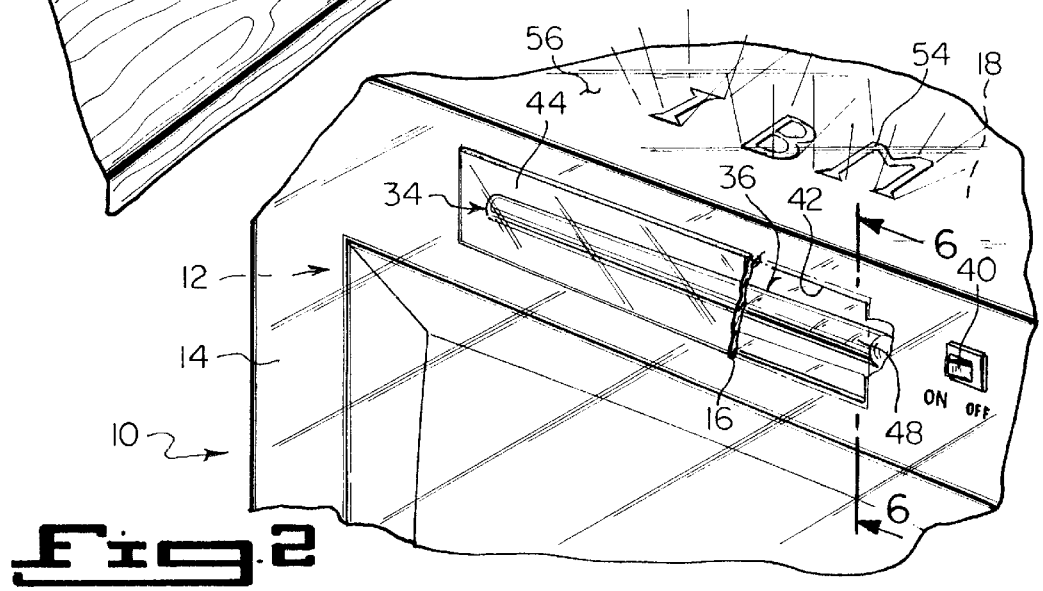
FIG. 2 is an enlarged front perspective view taken in the direction of arrow 2 in FIG. 1, with parts broken away and in section.
Figure 8:
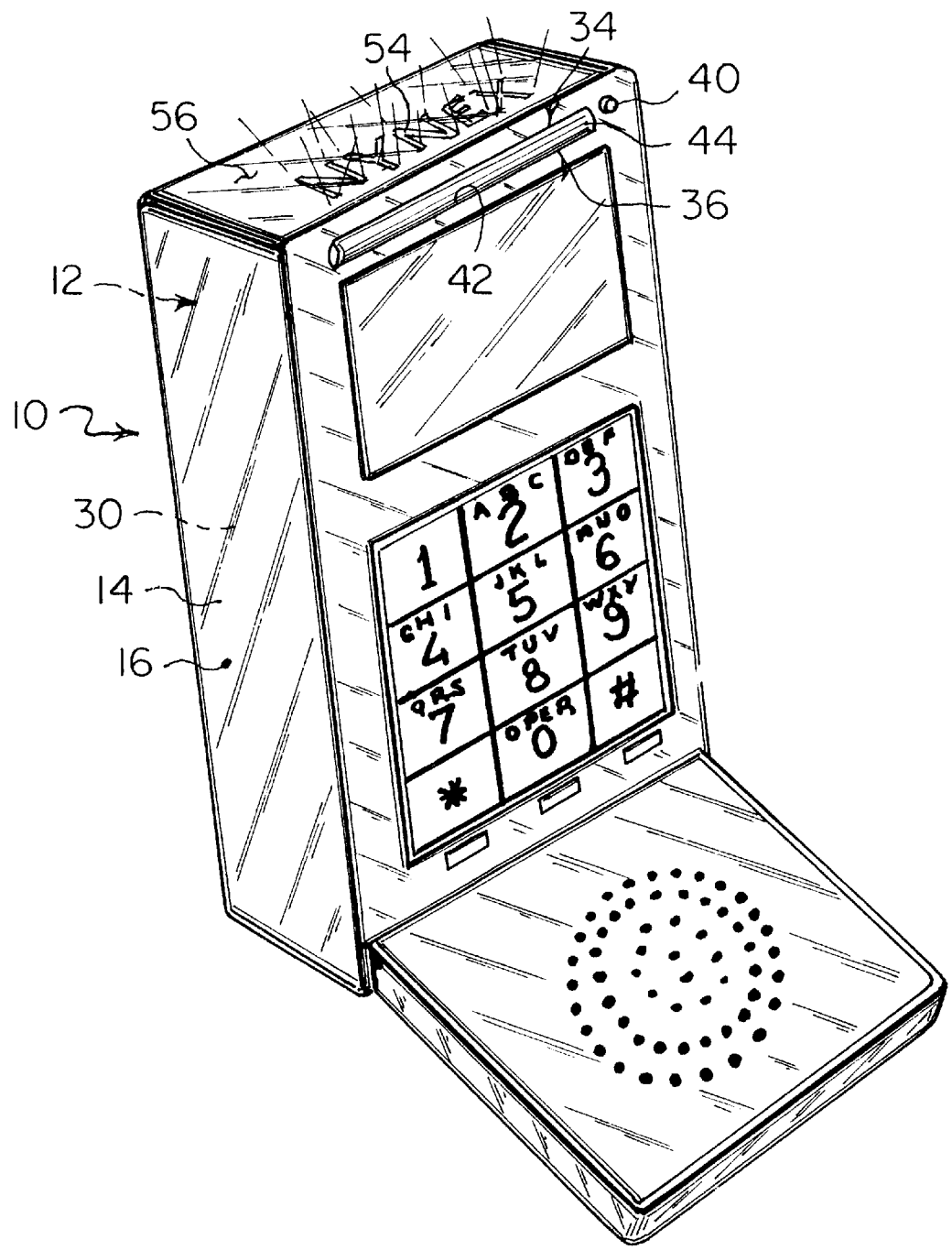
FIG. 8 is a front perspective view of a cellular telephone incorporating the present invention.
Figure 9:
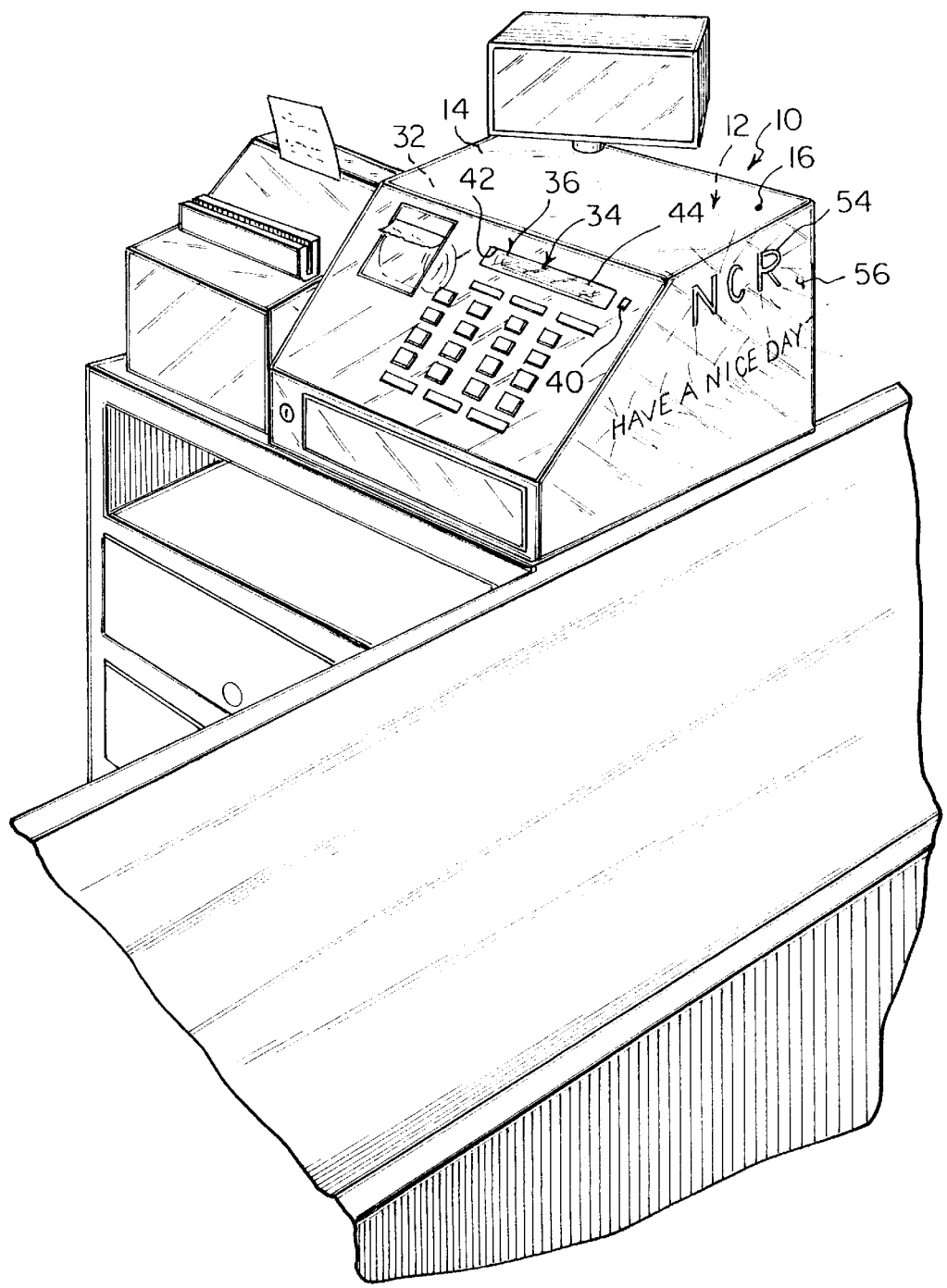
FIG. 9 is a front perspective view of a cash register incorporating the present invention.

Turning now descriptively to the drawings, in which similar reference characters denote similar elements throughout the several views, FIGS. 1 through 9 illustrate the present invention being a clear casing 10 for an electronic component 12. With regard to the reference numerals used, the following numbering is used throughout the various drawing figures.

10 clear casing
12 electronic component
14 enclosure of 10
16 transparent plastic material of 14 and 44
18 desktop computer monitor for 12
20 desktop computer keyboard for 12
22 desktop computer remote disk drive unit for 12
24 desktop computer tower disk drive unit for 12
26 desktop computer monitor stand disk drive unit for 12
28 desktop computer mouse for 12
30 cellular telephone for 12
32 cash register for 12
34 illuminating mechanism of 10
36 neon light bulb of 34
38 bracket of 34
40 switch of 34
42 opening in 12 adjacent 36
44 panel
46 snap-on clip on 44
48 glass envelope of 36
50 fiber-optic distribution network
52 fiber-optic pickup head on 50
54 logo on 56
56 exterior surface of 14

The clear casing 10 for the electronic component 12 comprises an enclosure 14 made out of a transparent plastic material 16 which extends about the periphery of the eletronic component 12, so as to enhance the esthetic appearance of the electronic component 12.

The electronic component 12 can be a desktop computer monitor 18, a desktop computer keyboard 20, a desktop computer remote disk drive unit 22, and a desktop computer tower disk drive unit 24. The electronic component 12 can also be a desktop computer monitor stand disk drive unit 26, a desktop computer mouse 28, a cellular telephone 30, and a cash register 32.

The clear casing 10 for the electronic component 12 further includes a mechanism 34, for illuminating the enclosure 14. The illuminating mechanism 34 consists of a neon light bulb 36 and a bracket 38 within the enclosure 14, for holding the neon light bulb 36 in place. A switch 40 is electrically connected to the neon light bulb 36, so as to manually turn the neon light bulb 36 on and off.

The enclosure 12 has an opening 42 adjacent to the neon light bulb 36. A panel 44 made out of the transparent plastic material 16, is sized to fit over the opening 42 in the enclosure 12. A plurality of snap-on clips 46 are on a rear surface of the panel 44, to maintain the panel 44 to the opening 42 in the enclosure 12 in a removable manner, so that the neon light bulb 36 can be replaced when needed.

The neon light bulb 36 includes a glass envelope 48 made in one of a variety of colors, so as to illuminate the enclosure 12 with color. The clear casing 10 further includes a fiber-optic distribution network 50 having a fiber-optic pickup head 52 coupled to one end of the neon light bulb 36, so as to better distribute light from the neon light bulb 36 throughout the enclosure 14.

A logo 54 is formed on an exterior surface 56 of the enclosure 14, out of the transparent plastic material 16. When the neon light bulb 36 is turned on, the logo 54 will be illuminated therefrom.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A clear casing for an electronic component comprising:
    a) an enclosure made out of a transparent plastic material which extends about the periphery of said electronic component, so as to enhance the esthetic appearance of said electronic component, said enclosure having an opening;
    b) means for illuminating said enclosure, said illuminating means including:
        i) a neon light bulb adjacent said opening of said enclosure; and
        ii) a bracket within said enclosure for holding said neon light bulb in place;
    c) a panel made out of a transparent plastic material and sized to fit over said opening in said enclosure; and
    d) a plurality of snap-on clips on a rear surface of said panel to maintain said panel to said opening in said enclosure in a removable manner, so that said neon light bulb can be replaced when needed.

2. A clear casing for an electronic component as recited in claim 1, wherein said electronic component is a desktop computer monitor.

3. A clear casing for an electronic component as recited in claim 1, wherein said electronic component is a desktop computer keyboard.

4. A clear casing for an electronic component as recited in claim 1, wherein said electronic component is a desktop computer remote disk drive unit.

5. A clear casing for an electronic component as recited in claim 1, wherein said electronic component is a desktop computer tower disk drive unit.

6. A clear casing for an electronic component as recited in claim 1, wherein said electronic component is a desktop computer monitor stand disk drive unit.

7. A clear casing for an electronic component as recited in claim 1, wherein said electronic component is a desktop computer mouse.

8. A clear casing for an electronic component as recited in claim 1, wherein said electronic component is a cellular telephone.

9. A clear casing for an electronic component as recited in claim 1, wherein said electronic component is a cash register.

10. A clear casing for an electronic component as recited in claim 1, wherein said illuminating means further includes a switch electrically connected to said neon light bulb, so as to manually turn said neon light bulb on and off.

11. A clear casing for an electronic component comprising:
   a) an enclosure made out of a transparent plastic material which extends about the periphery of said electronic component, so as to enhance the esthetic appearance of said electronic component; said enclosure having an opening
   b) means for illuminating said enclosure, illuminating means including:
      i) a neon light bulb adjacent said opening of said enclosure, said neon light bulb including a glass envelope made in one of a variety of colors, so as to illuminate said enclosure with color; and
      ii) a bracket within said enclosure for holding said neon light bulb in place.

12. A clear casing for an electronic component as recited in claim 1, further including a fiber-optic distribution network having a fiber-optic pickup head coupled to one end of said neon light bulb, so as to better distribute light from said neon light bulb throughout said enclosure.

13. A clear casing for an electronic component comprising:
   a) an enclosure made out of a transparent plastic material which extends about the periphery of said electronic component, so as to enhance the esthetic appearance of said electronic component; said enclosure having an opening
   b) means for iluminating said enclosure, said illuminating means including:
      i) a neon light bulb adjacent said opening of said enclosure; and
      ii) a bracket within said enclosure for holding said neon light bulb in place; and
   c) a logo formed in an exterior surface of said enclosure, out of said transparent pastic material, so that when said neon light bulb is turned on, said logo will be illuminated therefrom.

14. A clear casing for an electronic component as recited in claim 10, wherein said neon light bulb includes a glass envelope made in one of a variety of colors, so as to illuminate said enclosure with color.

15. A clear casing for an electronic component as recited in claim 14, further including a fiber-optic distribution network having a fiber-optic pickup head coupled to one end of said neon light bulb, so as to better distribute light from said neon light bulb throughout said enclosure.

16. A clear casing for an electronic component as recited in claim 15, further including a logo formed on an exterior surface of said enclosure, out of said transparent plastic material, so that when said neon light bulb is turned on, said logo will be illuminated therefrom.

* * * * *